United States Patent
Lin et al.

(10) Patent No.: US 9,511,568 B2
(45) Date of Patent: Dec. 6, 2016

(54) NON-POLYVINYLCHLORIDE (PVC) TILE

(71) Applicant: M.J. International Flooring and Interior Products Inc., New Taipei (TW)

(72) Inventors: Chen-Lung Lin, New Taipei (TW); Henn-Sheng Hsia, New Taipei (TW); Shih-An Lin, New Taipei (TW); Pen-Yuan Chen, New Taipei (TW)

(73) Assignee: M.J. INTERNATIONAL FLOORING AND INTERIOR PRODUCTS INC., New Taipei (TW)

( * ) Notice: Subject to any disclaimer, the term of this patent is extended or adjusted under 35 U.S.C. 154(b) by 0 days.

(21) Appl. No.: 14/789,679

(22) Filed: Jul. 1, 2015

(65) Prior Publication Data

US 2016/0263871 A1    Sep. 15, 2016

(30) Foreign Application Priority Data

Mar. 11, 2015 (TW) ............... 104107770 A

(51) Int. Cl.

| | |
|---|---|
| *B32B 27/08* | (2006.01) |
| *B32B 27/10* | (2006.01) |
| *B32B 7/02* | (2006.01) |
| *B32B 5/02* | (2006.01) |
| *B32B 27/20* | (2006.01) |
| *B32B 27/32* | (2006.01) |
| *B32B 27/40* | (2006.01) |

(52) U.S. Cl.
CPC .............. *B32B 27/08* (2013.01); *B32B 5/022* (2013.01); *B32B 7/02* (2013.01); *B32B 27/20* (2013.01); *B32B 27/32* (2013.01); *B32B 27/40* (2013.01); *B32B 27/10* (2013.01); *B32B 2255/10* (2013.01); *B32B 2255/26* (2013.01); *B32B 2262/101* (2013.01); *B32B 2307/412* (2013.01); *B32B 2307/554* (2013.01); *B32B 2307/744* (2013.01); *B32B 2419/04* (2013.01); *B32B 2451/00* (2013.01); *Y10T 428/24802* (2015.01); *Y10T 428/24851* (2015.01); *Y10T 428/24868* (2015.01)

(58) Field of Classification Search
CPC ............ B32B 37/10; Y10T 428/24851; Y10T 428/24802; Y10T 428/24868
See application file for complete search history.

(56) References Cited

U.S. PATENT DOCUMENTS

2003/0212211 A1* 11/2003 Lenox ............... C08L 15/00
525/222
2006/0084743 A1* 4/2006 Chen .................. C08L 23/0869
524/445

(Continued)

*Primary Examiner* — Betelhem Shewareged
(74) *Attorney, Agent, or Firm* — Muncy, Geissler, Olds & Lowe, P.C.

(57) ABSTRACT

In a non-PVC tile, a bottom material layer, a printing layer and a transparent wear-resistant layer are disposed from bottom to top. The printing layer includes an inorganic filling material of 55~90 percentage weight (wt %). The coefficient of thermal expansion of the bottom material layer and the transparent wear-resistant layer are larger than that of the printing layer. When the bottom material layer, the printing layer and the transparent wear-resistant layer are heated and then cooled, the bottom material layer and the transparent wear-resistant layer symmetrically contract with the printing layer being a center.

11 Claims, 3 Drawing Sheets

(56) References Cited

U.S. PATENT DOCUMENTS

2012/0247663 A1* 10/2012 Chen .................. B29C 43/003
  156/276
2013/0248108 A1* 9/2013 Chen .................. E04F 15/107
  156/324.4

* cited by examiner

NON-POLYVINYLCHLORIDE (PVC) TILE

This application claims priority for Taiwan patent application no. 104107770 filed on Mar. 11, 2015, the content of which is incorporated by reference in its entirely

BACKGROUND OF THE INVENTION

1. Field of the Invention

The present invention relates to a. tile, particularly to a non-polyvinylchloride (PVC) tile.

2. Description of the Related Art

Refer to FIG. 1. A polyvinylchloride (PVC) tile 10 is a multilayer structure comprising a wear-resistant layer, a printing layer and a bottom material layer. The wear-resistant layer is composed of PVC, a plasticizer, a stabilizer, and other processing agents. The wear-resistant layer has a thickness of 0.12~1 mm. The printing layer comprises a PVC film used as a base layer. A wood grain layer, a stone grain layer, or other pattern layer is coated on the base layer having a thickness of 0.05~0.15 mm. The bottom material layer is composed of PVC, a filling material of 40~80 percentage weight (wt %), a plasticizer, a stabilizer, and other processing agents. The filling material is calcium carbonate, magnesium carbonate, barium sulfate, talc, silicon oxide, silicon carbide, glass fiber, wood powder, starch, organic powder or inorganic powder.

The wear-resistant layer, the printing layer and the bottom material layer are combined into a product in a hot pressing, continuous lamination way or laminated with glue. Due to these layers have different coefficient of thermal expansion (CTE), the product warps or arches. In order to overcome the problem, the thickness or the PVC percentage of the bottom material layer in the PVC tile can be increased.

However, PVC itself is a hard material. In order to fabricate the tile, the plasticizer is added to PVC so that the plastic tile has soft, easily-bending, folding and easily-shaped properties and good elasticity. As a result, the plasticizer is an essential additive for processing PVC. Although the plasticizer with low toxicity is mainly used for processing PVC at this stage, consumers still fear for plasticizers. Accordingly, consumers concerned about the safety of the PVC product.

To overcome the abovementioned problems, the present invention provides a non-polyvinylchloride (PVC) tile, so as to solve the afore-mentioned problems of the prior art.

SUMMARY OF THE INVENTION

A primary objective of the present invention is to provide a non-polyvinylchloride (PVC) tile, which adds an inorganic filling material of 55~90 percentage weight (wt %) to a printing layer. When the bottom material layer, the printing layer and the transparent wear-resistant layer are heated and then cooled, the bottom material layer and the transparent wear-resistant layer symmetrically contract with the printing layer being a center, whereby the bottom material layer and the transparent wear-resistant layer are not affected by the printing layer easily, so as to prevent the tile from warping and arching.

To achieve the abovementioned objectives, the present invention provides a non-PVC tile, which comprises a bottom material layer, a printing layer and a transparent wear-resistant layer. The printing layer is disposed on the bottom material layer, and the transparent wear-resistant layer is disposed on the printing layer. The printing layer comprises an inorganic filling material of 55~90 percentage weight (wt %). The coefficient of thermal expansion of the bottom material layer and the transparent wear-resistant layer are larger than that of the printing layer. When the bottom material layer, the printing layer and the transparent wear-resistant layer are heated and then cooled, the bottom material layer and the transparent wear-resistant layer symmetrically contract with the printing layer being a center.

Below, the embodiments are described in detail in cooperation with the drawings to make easily understood the technical contents, characteristics and accomplishments of the present invention.

DETAILED DESCRIPTION OF THE INVENTION

Figure 1:
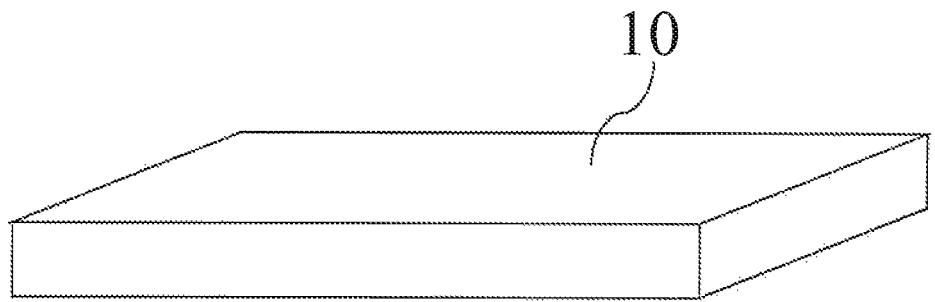
FIG. 1 is a perspective view schematically showing a. PVC tile in the traditional technology.
Figure 2:
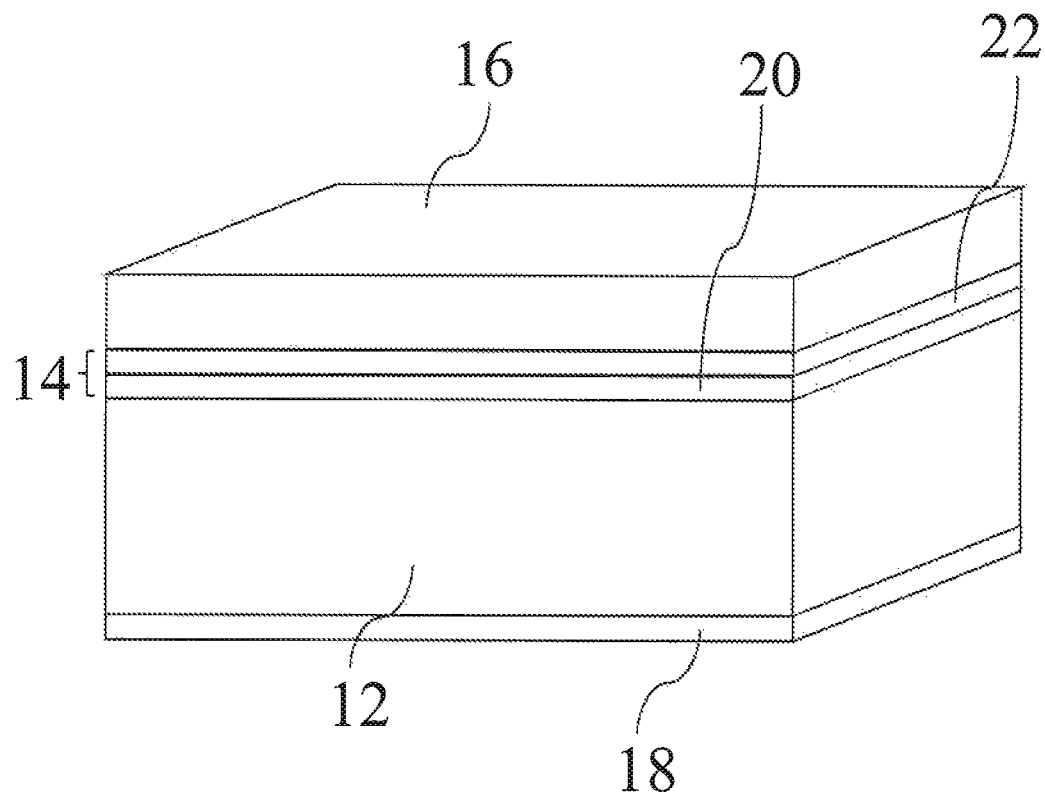
FIG. 2 is a perspective view schematically showing a non-PVC tile according to the first embodiment of the present invention.

Refer to FIG. 2. The first embodiment of the present invention comprises a bottom material layer 12, a printing layer 14, a transparent wear-resistant layer 16 and a glass fiber layer 18. The glass fiber layer 18 is combined with the bottom material layer 12, the printing layer 14 and the transparent wear-resistant layer 16 to enhance the overall strength of the tile, For example, the glass fiber layer 18 is disposed on a bottom surface of the bottom material layer 12. The glass fiber layer 18 can be disposed on a floor or a raised floor. The bottom material layer 12 has a thickness of 0.5~5 mm, and the printing layer 14 has a thickness of 0.05~0.3 mm, and the transparent wear-resistant layer 16 has a thickness of 0.1~1 mm. The bottom material layer 12 comprises thermoplastic of 5~39.5 percentage weight (wt %), a filling material of 60~90 wt % and a processing agent of 0.5~5 wt %, and the processing agent is a dispersing agent, a lubricant, a brightening agent, an antioxidant, an antistatic agent or a coupling agent, and the coupling agent is Dow Corning® Z6040, Dow Corning® Z6030, or [2-(3,4-Epoxycyclohexyl)ethyl]trimethoxysilane, and the brightening agent is $TiO_2$ or ZnO, and the lubricant is calcium stearate, zinc stearate, or paraffin-based processing oil, and the dispersing agent is METABLEN P530A, and the antistatic agent is tri-n-butylmethylammonium bis-(trifluoromethanesulfonyl)imide or N,N-Bis(2-hydroxyethyl) stearylamine, and the antioxidant is Tetrakis methylene (3,5-di-tert-butyl-4-hydroxyl propoinate) Methane. Besides, the thermoplastic is homo-polypropylene, ethylene propylene copolymer or polyethylene. The filling material is organic powder or inorganic powder, such as calcium carbonate, magnesium carbonate, barium sulfate, talc, silicon oxide, silicon carbide, glass fiber, wood powder or starch.

The printing layer 14 is disposed on the bottom material layer 12. The printing layer 14 comprises an inorganic filling material of 55~90 wt %, thermoplastic of 5~44.5 wt % and a processing agent of 0.5~5 wt %. The processing agent is a dispersing agent, a lubricant, a brightening agent, an antioxidant, an antistatic agent or a coupling agent, and the coupling agent is Dow Corning® Z6040, Dow Corning® Z6030, or [2-(3,4-Epoxycyclohexyl)ethyl]trimethoxysilane, and the brightening agent is $TiO_2$ or ZnO, and the lubricant is calcium stearate, zinc stearate, or paraffin-based processing oil, and the dispersing agent is METABLEN P530A, and the antistatic agent is tri-n-butylmethylammonium bis-(trifluoromethanesulfonyl)imide or N,N-Bis(2-hydroxyethyl) stearylamine, and the antioxidant is Tetrakis methylene (3,5-di-tert-butyl-4-hydroxyl propoinate) Methane. The inorganic filling material is calcium carbonate, talc, titanium dioxide, magnesium carbonate, barium sulfate, silicon oxide or silicon carbide. The thermoplastic is homo-polypropylene, ethylene propylene copolymer or polyethylene.

Due to the inorganic filling material of the printing layer 14, the bottom material layer 12 and the transparent wear-resistant layer 16 symmetrically contract with the printing layer 14 being a center when the bottom material layer 12, the printing layer 14 and the transparent wear-resistant layer 16 are heated and then cooled. The bottom material layer 12 and the transparent wear-resistant layer 16 are not affected by the printing layer 14 easily to prevent the tile from warping and arching. The transparent wear-resistant layer 16 is disposed on the printing layer 14. The transparent wear-resistant layer 16 comprises thermoplastic, such as homo-polypropylene, ethylene propylene copolymer, polyethylene, thermoplastic polyurethane (TPU), thermoplastic polyolefin (TPO), SURLYN based on ethylene-methacrylic acid.

The tile of the present invention is a multilayer structure, In addition to the bottom material layer 12, the printing layer 14 and the transparent wear-resistant layer 16, the multilayer structure further comprises a functional layer, such as a scratch-resistant coating, a slip-resistant coating, a matting coating or an antibacterial coating formed on a top surface of the transparent wear-resistant layer 16. The scratch-resistant coating is used to enhance the wear resistance of surface. The slip-resistant coating is used to enhance the slippery resistance. The matting coating is used to reduce luster.

The coefficient of thermal expansion (CTE) of the bottom material layer 12 and the transparent wear-resistant layer 16 are larger than the coefficient of thermal expansion of the printing layer 14. When the bottom material layer 12, the printing layer 14 and the transparent wear-resistant layer 16 are heated and then cooled, the bottom material layer 12 and the transparent wear-resistant layer 16 symmetrically contract with the printing layer 14 being a center.

The printing layer 14 further comprises a printing base layer 20 and a pattern layer 22. The printing base layer 20 comprises inorganic filling material of 55~90 wt %, thermoplastic of 5~44.5 wt % and the processing agent of 0.5~5 wt %. The printing base layer 20 is disposed on the bottom material layer 12. The pattern layer 22 is realized with a wood grain layer, a stone grain layer or an ink-patterned layer. The pattern layer 22 is disposed on the printing base layer 20. The transparent wear-resistant layer 16 is disposed on the pattern layer 22. The layers are combined into the tile in a hot pressing and lamination way. During the hot pressing and lamination process, the printing base layer 20 can flow at a high temperature. If the pattern layer 22 is an ink-patterned layer, the printing base layer 20 will move the ink so that the original pattern is deformed or blurred. As a result, the inorganic filling material of 55~90 wt % is added to the printing base layer 20, so as to effectively reduce the flowability of the plastic at a high temperature, thereby maintaining the pattern integrity after the hot lamination process. However, if too much inorganic filling material is added to the printing base layer 20, the printing base layer 20 is too hard and brittle. If fewer inorganic filling materials are added to the printing base layer 20, the CTE is not effectively reduced and the ink does not prevent from flowing. Accordingly, the inorganic filling material has an appropriate range of 55~90 wt %, preferably 60~85 wt %. The inorganic filling material has the best range of 65~80 wt %.

Besides, the glass fiber layer 18 also can be lacked in the first embodiment to prevent the tile of the present invention from warping and arching.

Figure 3:
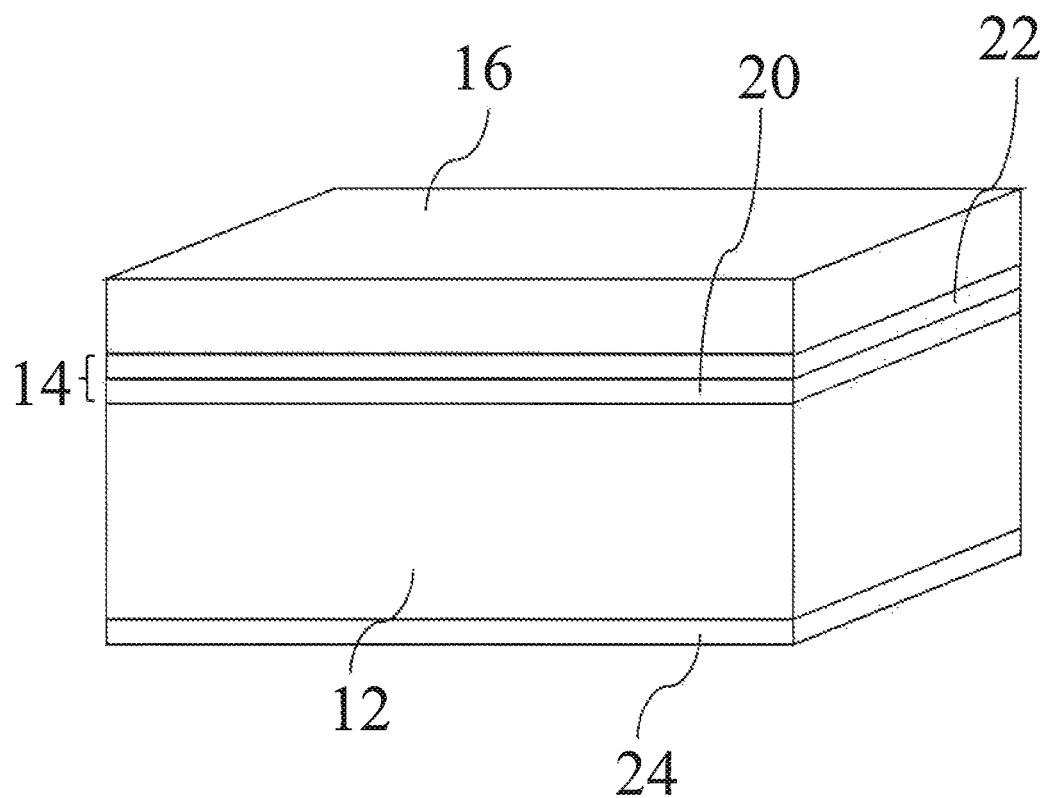
FIG. 3 is a perspective view schematically showing a non-PVC tile according to the second embodiment of the present invention.

The present invention also provides the second embodiment, as shown in FIG. 3. The first embodiment is different from the second embodiment in the glass fiber layer 18 of the first embodiment is replaced with a non-woven layer 24, so as to enhance the glue-absorbing amount of the bottom of the tile and improve the ability of the tile to bond to a floor.

The present invention provides four experiments to prove that the inorganic filling material of the printing layer 14 is helpful to prevent the tile from warping and arching. In the first experiment, the bottom material layer 12, the printing layer 14 and the transparent wear-resistant layer 16 are provided. The bottom material layer 12, the printing layer 14 and the transparent wear-resistant layer 16 respectively have thicknesses of 2.5 mm, 0.2 mm and 0.4 mm. The printing layer 14 has the inorganic filling material of 85 wt %, and the bottom material layer 12 has the powders of 83 wt %. After the bottom material layer 12, the printing layer 14 and the transparent wear-resistant layer 16 are stacked together, a hot pressing and lamination process is performed on them. In the process, the bottom material layer 12, the printing layer 14 and the transparent wear-resistant layer 16 are pressured under 60 kg/cm$^2$ at 150° C. for 30 minutes. Then, they are cooled to ambient temperature. Next, they are trimmed into a square with side length of 9.5 inches. After measurement, the warping heights for the four right angles of the square are less than 0.1 mm, and the printing pattern is not deformed.

In the second experiment, the bottom material layer 12, the printing layer 14 and the transparent wear-resistant layer 16 are provided. The bottom material layer 12, the printing layer 14 and the transparent wear-resistant layer 16 respectively have thicknesses of 2.5 mm, 0.12 mm and 0.4 mm. The printing layer 14 has the inorganic filling material of 75 wt %, and the bottom material layer 12 has the powders of 83 wt %. After the bottom material layer 12, the printing layer 14 and the transparent wear-resistant layer 16 are stacked together, a hot pressing and lamination process is performed on them. In the process, the bottom material layer 12, the printing layer 14 and the transparent wear-resistant layer 16 are pressured under 60 kg/cm$^2$ at 150° C. for 30 minutes. Then, they are cooled to ambient temperature. Next, they are trimmed into a square with side length of 9.5 inches. After measurement, the warping heights for the four right angles of the square are less than 0.1 mm, and the printing pattern is riot deformed.

In the third experiment, the bottom material layer 12, the printing layer 14 and the transparent wear-resistant layer 16 are provided. The bottom material layer 12, the printing layer 14 and the transparent wear-resistant layer 16 respectively have thicknesses of 2.5 mm, 0.12 mm and 0.4 mm. The printing layer 14 has the inorganic filling material of 65 wt %, and the bottom material layer 12 has the powders of 83 wt %. After the bottom material layer 12, the printing layer 14 and the transparent wear-resistant layer 16 are stacked together, a hot pressing and lamination process is performed on them. In the process, the bottom material layer 12, the printing layer 14 and the transparent wear-resistant layer 16 are pressured under 60 kg/cm$^2$ at 150° C. for 30 minutes. Then, they are cooled to ambient temperature.

Next, they are trimmed into a square with side length of 9.5 inches. After measurement, the warping heights for the four right angles of the square are 0.1~0.2 mm, and the printing pattern is not deformed.

In the fourth experiment, the bottom material layer 12, the printing layer 14 and the transparent wear-resistant layer 16 are provided. The bottom material layer 12, the printing layer 14 and the transparent wear-resistant layer 16 respectively have thicknesses of 2.5 mm, 0.12 mm and 0.4 mm. The printing layer 14 is mainly made of ethylene propylene copolymer. The inorganic filling material is not added to the printing layer 14. The bottom material layer 12 has the powders of 83 wt %. After the bottom material layer 12, the printing layer 14 and the transparent wear-resistant layer 16 are stacked together, a hot pressing and lamination process is performed on them. In the process, the bottom material layer 12, the printing layer 14 and the transparent wear-resistant layer 16 are pressured under 60 kg/cm$^2$ at 150° C. for 30 minutes. Then, they are cooled to ambient temperature. Next, they are trimmed into a square with side length of 9.5 inches, After measurement, the warping heights for the four right angles of the square are 0.5~1.0 mm, and the printing pattern is deformed and blurred.

In conclusion, the present invention adds an appropriate amount of the inorganic filling material to the printing layer, whereby the bottom material layer and the transparent wear-resistant layer symmetrically contract with the printing layer being a center when the bottom material layer, the printing layer and the transparent wear-resistant layer are heated. As a result, the tile can prevent from warping and arching.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A non-polyvinylchloride (PVC) tile comprising:
   a bottom material layer, and said bottom material layer comprises thermoplastic of 5~39.5 wt %, a filling material of 60~90 wt % and a processing agent of 0.5~5 wt %;
   a printing layer disposed on said bottom material layer and comprising an inorganic filling material of 55~90 percentage weight (wt %); and
   a transparent wear-resistant layer disposed on said printing layer, and coefficient of thermal expansion of said bottom material layer and said transparent wear-resistant layer are larger than a coefficient of thermal expansion of said printing layer, when said bottom material layer, said printing layer and said transparent wear-resistant layer are heated and then cooled, said bottom material layer and said transparent wear-resistant layer symmetrically contract with said printing layer being a center, and said transparent wear-resistant layer comprises thermoplastic, and said bottom material layer has a thickness of 0.5~5 mm, and said printing layer has a thickness of 0.05~3 mm, and said transparent wear-resistant layer has a thickness of 0.1~1 mm, and said printing layer further comprising:
   a printing base layer disposed on said bottom material layer and comprising said inorganic filling material, and said printing base layer comprises thermoplastic of 5~44.5 wt % and a processing agent of 0.5~5 wt %, and said thermoplastic is homo-polypropylene, ethylene propylene copolymer or polyethylene; and
   a pattern layer disposed on said printing base layer, and said transparent wear-resistant layer is disposed on said pattern layer.

2. The non-PVC tile according to claim 1, wherein said processing agent is a dispersing agent, a lubricant, a brightening agent, an antioxidant, an antistatic agent or a coupling agent.

3. The non-PVC tile according to claim 1, wherein said inorganic filling material is calcium carbonate, talc, titanium dioxide, magnesium carbonate, barium sulfate, silicon oxide or silicon carbide.

4. The non-PVC tile according to claim 1, wherein said pattern layer is a wood grain layer, a stone grain layer or an ink-patterned layer.

5. The non-PVC tile according to claim 1, wherein said thermoplastic is homo-polypropylene, ethylene propylene copolymer or polyethylene.

6. The non-PVC tile according to claim 1, wherein said filling material is organic powder or inorganic powder.

7. The non-PVC tile according to claim 1, wherein said filling material is calcium carbonate, magnesium carbonate, barium sulfate, talc, silicon oxide, silicon carbide, glass fiber, wood powder or starch.

8. The non-PVC tile according to claim 1, wherein said processing agent is a dispersing agent, a lubricant, a brightening agent, an antioxidant, an antistatic agent or a coupling agent.

9. The non-PVC tile according to claim 1, wherein said thermoplastic is homo-polypropylene, ethylene propylene copolymer, polyethylene, thermoplastic polyurethane (TPU), thermoplastic polyolefin (TPO).

10. The non-PVC tile according to claim 1, further comprising a scratch-resistant coating, a slip-resistant coating or a matting coating formed on a top surface of said transparent wear-resistant layer.

11. The non-PVC tile according to claim 1, further comprising a glass fiber layer or a non-woven layer disposed on a bottom surface of said bottom material layer.

* * * * *